United States Patent [19]

Nagasaka

[11] Patent Number: 4,745,312
[45] Date of Patent: May 17, 1988

[54] STEPPING MOTOR
[75] Inventor: Nagahiko Nagasaka, Iruma, Japan
[73] Assignee: Kabushiki Kaisha Yaskawa Denki Seisakusho, Japan
[21] Appl. No.: 942,461
[22] Filed: Dec. 16, 1986
[30] Foreign Application Priority Data Jan. 9, 1986 [JP] Japan ................................ 61-2738
Sep. 30, 1986 [JP] Japan ............................ 61-233028

[51] Int. Cl.⁴ .......................................... H02K 37/00
[52] U.S. Cl. ............................... 310/49 R; 310/67 R; 310/154; 310/181
[58] Field of Search .......... 310/49, 152, 154, 162–165, 310/181

[56] References Cited

U.S. PATENT DOCUMENTS 3,555,325 1/1971 Inariba ........................... 310/154 X
3,984,711 10/1976 Kordik ........................... 310/181 X
3,999,090 12/1976 Sinnott ................................ 310/49
4,080,540 3/1978 Karube ............................ 310/67 X Primary Examiner—Donovan F. Duggan
Attorney, Agent, or Firm—Beveridge, DeGrandi & Weilacher

[57] ABSTRACT

In a stepping motor having a stator and a rotor, the stator is made of a laminated iron core of a cylindrical shape having a plurality of slots formed around the periphery at a constant pitch. Coil windings concentrately wound are inserted in the slots, and permanent magnets of a planar shape are adhere around the surface of the iron core, thereby providing stator magnetic poles. The rotor on the other hand is made in the form of a circular disk at least a part of which is made of a magnetic material. A number of teeth are formed around the peripheral portion at a constant pitch thereby providing rotor magnetic poles which are positioned in opposition to the stator magnetic poles with a predetermined air gap maintained therebetween.

8 Claims, 3 Drawing Sheets

STEPPING MOTOR

BACKGROUND OF THE INVENTION

This invention relates to a thin and high-output stepping motor adapted to be used in a floppy disk control mechanism and an industrial robot for the purpose of determining positions at a high precision.

Heretofore, a stepping motor of the above described type having an axial gap has been proposed (refer to Japanese Patent Application No. 11559/1984 invented by Yasuyuki Kojima and filed on Jan. 24, 1984). Although the construction of the disclosed stepping motor is comparatively simple, the stator core thereof must be made into a solid form, thus increasing iron loss and reducing efficiency when the stepping motor is driven from a polyphase high-frequency power source. Furthermore, since the utility of magnetic fluxes is reduced at a high-speed operation, the size of the magnet used in the stepping motor increases, and the production of a small size, thin, and high-power stepping motor is thereby made difficult.

A stepping motor having a radial gap has also been proposed (refer to, for instance, U.S. Pat. No. 3,866,104 entitled "Five phase stepping motor", invented by Günter Heine). However, a large number of salient poles and slots are formed around the surfaces of the rotor and the stator, and therefore particularly in the case of a stepping motor having a minute increment, the number of the production steps has been inevitably increased. In addition, since the rotor of this type stepping motor is made of permanent magnets, the required amount of the permanent magnets increases, thus increasing the production cost of the stepping motor.

SUMMARY OF THE INVENTION

A primary object of the invention is to provide a stepping motor wherein the above described difficulties of the conventional constructions can be substantially eliminated.

A more specific object of the invention is to provide a stepping motor wherein the iron loss and the labor cost for forming slots or teeth in the stator can be substantially reduced.

Another object of the invention is to provide a stepping motor wherein the inertia of the rotor is reduced, and the power-rate and the servo-performance of the stepping motor can be improved.

Still another object of the invention is to provide a stepping motor, the higher resolution of which is substantially improved.

According to the present invention, there is provided a stepping motor comprising a stator and a rotor, the stator comprising a laminated iron core of a cylindrical shape with a plurality of slots formed around the outer peripheral portion thereof at a constant pitch, concentrately wound coils inserted in the slots of the iron core, and permanent magnets formed in a planar shape adhered to an outer surface of the laminated iron core so as to provide a number of stator magnetic poles, while the rotor comprising a circular disk-shaped body, at least an outer peripheral portion thereof being made of a magnetic material, and a number of teeth formed around the outer peripheral portion at a constant pitch so as to provide a number of rotor magnetic poles which are placed in opposition to the stator magnetic poles, with a predetermined air gap maintained therebetween.

Preferably the outer peripheral portion of the rotor is bent perpendicularly, and the teeth are formed along the bent portion such that the rotor magnetic poles thereby formed are held in opposition to the stator magnetic poles in a radial direction of the stator.

Alternatively, the outer peripheral portion of the stator core is bent perpendicularly so that the stator magnetic poles formed along the bent portion oppose the rotor magnetic poles in an axial direction of the stator.

DESCRIPTION OF THE PREFERRED EMBODIMENTS

Figure 1:
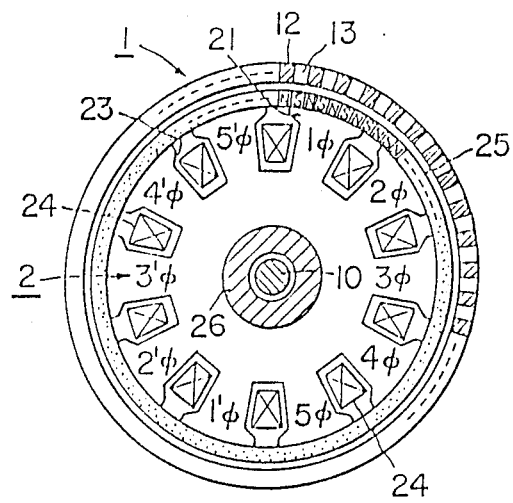
FIGS. 1(a) and 1(b) are a plan view and an elevational view, both in section, showing a preferred embodiment of this invention.
Figure 1:
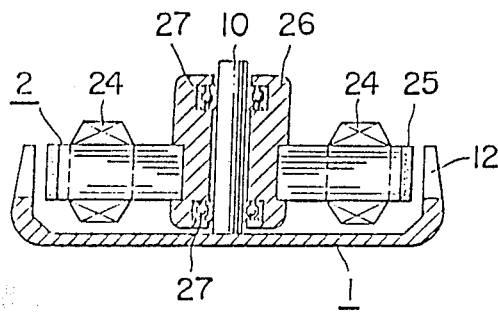
Figure 2:
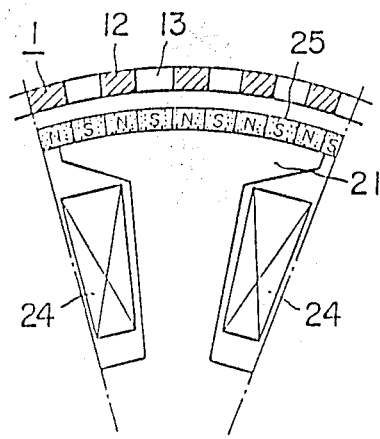
FIG. 2 is a plan view in section, showing one part of the embodiment.
Figure 3:
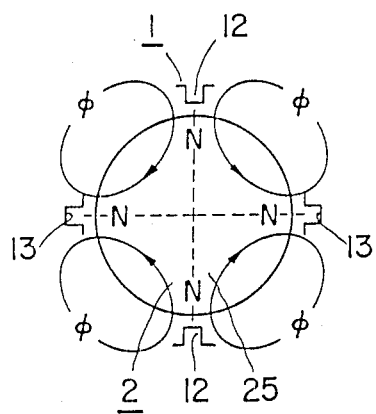
FIG. 3 is a diagram for explaining the operation of the embodiment.

A preferred embodiment of the present invention will now be described with reference to FIGS. 1 to 3.

A ten phase stepping motor according to the preferred embodiment comprises a stator 2 made of a cylindrical laminated core with 10 slots 23 formed along the outer circumference thereof at an equal pitch. Five phase windings 24 wound in a concentrated manner are inserted in the 10 slots 23 (a five phase synchronous motor is operable as a 10 phase stepping motor). A plurality of permanent magnets 25 formed into a planar shape are secured around the outer periphery of the stator core, and magnetized at a predetermined pole pitch.

The stepping motor further comprises a rotor 1 made of a ferromagnetic material and formed into a pan shape having a peripheral portion uprising cylindrically. A plurality of teeth 12 and grooves 13 are cut-formed alternately along the circumference of the cylindrically rising-up portion at a constant pitch, the teeth 12 projecting in the axial direction of the rotor 1. When the number of pole pairs of the permanent magnets 25 provided on the stator 2 is assumed to be $N_m$ and the number of the teeth 12 provided on the rotor 1 is assumed to be $N_t$, the following relation is maintained between the two numbers.

$$|N_m - N_t| = 2$$

The output shaft 10 of the rotor 1 is rotatably supported by a housing 26 of the stepping motor through a bearing 27 so that the cylindrically bent portion of the rotor 1 located outside of the stator 2 opposes the permanent magnets of the stator 2 with a predetermined air gap maintained therebetween.

In an example where the number of pole pairs $N_m$ of the permanent magnets 25 is selected to be 48 and the number $N_t$ of the teeth 12 is selected to be 50, the teeth 12 of the rotor 1 and permanent magnets 25 of the stator 2 are held in a relation described as follows. Since the difference between $N_t$ and $N_m$ is 2, in a case where the center of one of the teeth 12 is brought into a position aligning with an N pole of the permanent magnet 25, the same positional relation is maintained at an angular position spaced apart from the first position by a 180° angle, while at other positions spaced apart by +90° and −90° from the first position, an N pole of the permanent magnets 25 aligns with the center of a groove 13, that is, an S pole aligns with the center of a tooth 12 as shown in FIG. 3.

Thus, magnetic fluxes $\phi$ of four poles flow from N poles to S poles of the permanent magnets 25, and when the rotor 1 is rotated by one pitch of the teeth distribution, the magnetic fluxes $\phi$ of four poles are rotated by an angle of 180°.

Figure 4:
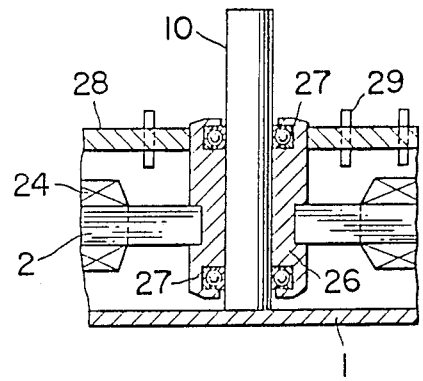
FIG. 4 is an elevational view, in section, showing another embodiment of the invention.

FIG. 4 illustrates another embodiment of the invention wherein a printed circuit board 28 is provided on a side of the stator 2 away from the rotor 1, and a driving circuit, pulse distributing circuit and the like are provided on the printed circuit board 28.

Figure 5A:
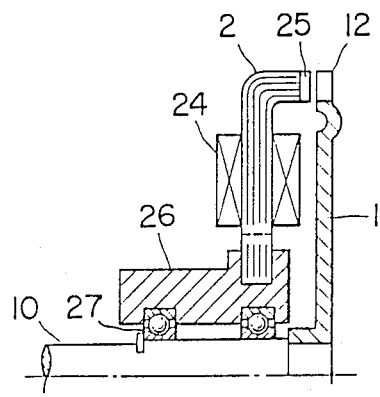
FIG. 5(a) is an elevational view, in section, showing one part of still another embodiment of the invention.
Figure 5B:
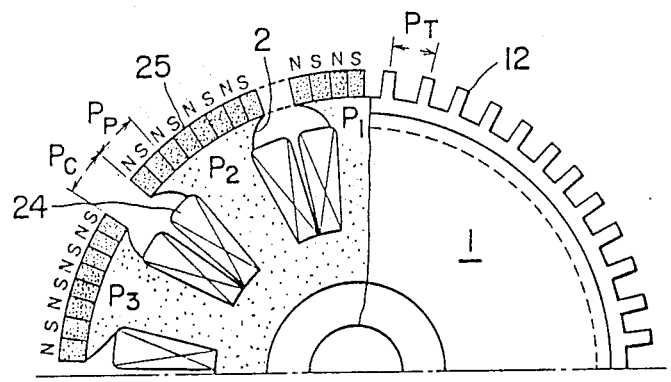
FIG. 5(b) is a plan view, partly in section, showing still another embodiment.

Still another embodiment of the invention is illustrated in FIGS. 5(a) and 5(b) wherein like members as those in FIGS. 1(a) and 1(b) are designated by like reference numerals.

Although the embodiment shown in FIGS. 5(a) and 5(b) is also of five phases, the number of phases may be varied as desired so far as it remains to be a polyphase motor.

In this embodiment, an output shaft 10 extending from a rotor 1 is rotatably supported by a housing 26 through a bearing 27 secured to an inner portion of the housing 26. A portion of the shaft 10 away from an end coupled to a load is secured to the rotor 1 of a disk shape. A number of teeth 12 are also cut-formed along the periphery of the rotor 1 at a constant pitch $P_T$.

On the other hand, a stator 2 having a number of permanent magnets 25 is provided in opposition to the rotor 1. In this embodiment, the pole pairs of the permanent magnets 25 are distributed at a pitch $P_P$ equal to the tooth pitch $P_T$. The stator 2 is preferably made of a laminated core of ferromagnetic thin plates formed into a pan shape. A plurality of slots are formed around the circumference of the laminated core, and a number of concentratedly wound coils 24 are inserted into the slots. The core may otherwise be formed into a solid body of a suitable magnetic substance. At an inner portion, the stator 2 is secured to a housing 26. Although in the shown example, the number of pole pairs $N_S$ of the permanent magnets 25 secured to the top of each salient pole is selected to be 4 ($N_S=4$), the number of phases $N_P$ is selected to be 5 ($N_P=5$), and the number of the rotor teeth $N_T$ is selected to be 50 ($N_T=50$), the embodiment is not necessarily restricted to those values, and so far as the following relation holds, $$P_C = P_P[(N_P \pm 1)/N_P]$$

$$P_T = P_P$$

$$N_T = [(N_S + (N_P \pm 1)/N_P] \times 2 \times N_P \pm 2 \quad (1)$$

wherein $P_C$ represents the width of the slot opening;

$P_P$ represents the pitch of the pole pairs of the permanent magnets; and $P_T$ represents the tooth pitch, the operation of this embodiment of the invention is always assured. Since the width of the slot opening $P_C$ is made equal to $[(N_P \pm 1)/N_P] \times P_P$ and $P_T = P_P$, the rotor teeth 12 and the pole pairs of the permanent magnets correspond to each other over the entire circumference of the rotor and the stator, and hence the phase difference between adjacent two poles of the stator is held to be $\pm 360/N_P$.

Figure 6:
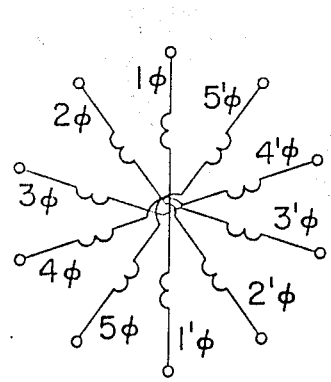
FIGS. 6 and 7 are diagrams showing different connections of windings.
Figure 7:
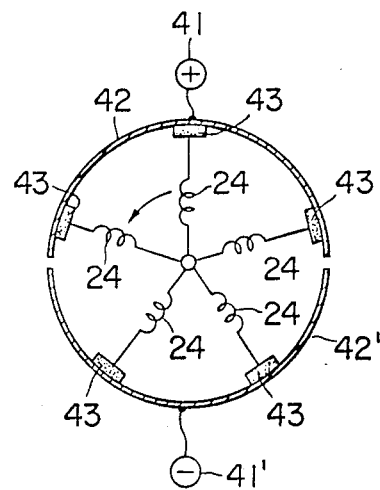

Two sets of windings $1\Phi \sim 5\Phi$ and $1'\Phi \sim 5'\Phi$ are wound as shown in FIG. 1(a) and connected as shown in FIG. 6 so as to make magnetic fluxes of four poles flow, and hence altogether five phase windings are provided. In other words, a five phase synchronous motor is obtained when the windings 24 are connected such that $1\Phi$ and $1'\Phi$, $2\Phi$ and $2'\Phi$ and so forth are connected in series. A 10 phase permanent magnet type stepping motor is thus obtained when the five phase windings 24 are connected in star as shown in FIG. 7 and the motor is driven in a bipolar 180° energization manner or 2~3 phase alternate energizing manner. In this case, the stepping angle of the stepping motor is made equal to $360/50 \times 10 = 0.72°$, and the resolution of the same is made equal to 500 steps/rotation.

In FIG. 7, numeral 41 and 41' designates, a positive terminal of the power source, marked ⊕ and a negative terminal marked ⊖ thereof respectively, numeral 42 and 42' designates segment conductors, numeral 43 designates a brush contacting the segment conductors 42, 42' and an arrow mark designates the sliding direction of the brushes 43.

Although the invention has been so far described with respect to the preferred embodiments thereof, the stepping motor may otherwise be modified as follows.

(1) A planar portion other than the cylindrical portion of the rotor is made of an aluminum alloy. In this manner, the inertia of the rotor can be reduced, and since magnetic flux leaking from the coil ends of the windings are reduced by the eddy current induced in the planar portion, the inductance of the windings may also be reduced.

(2) A printed circuit board 28 may be further provided on a load side of the stator away from the rotor as shown in FIG. 4, and a driving circuit, pulse distributing circuit and the like may be provided on the printed circuit board 28.

(3) The planar portion of the rotor 1 may otherwise be made of a plurality of plied plates so that a damping effect is thereby obtained and noises and the like are reduced.

According to the invention the following advantageous features can be obtained, so that it is apparent that the present invention contributes much to the related fields of the industry.

(1) Since the magnetic poles of the stator are formed by simply adhering a thin sheet of permanent magnets to the stator or by magnetizing the thin sheet thereafter, the labor cost of forming teeth can be substantially reduced.

(2) Since the stator is made of a laminated core of ferromagnetic thin plates, iron loss at the time of driving the stepping motor from a high-frequency power supply can be substantially reduced.

(3) Since the teeth of the rotor are thin, the inertia thereof can be reduced, and the power rating as well as the servo-performance can be improved.

(4) Since the coils of the stator electromagnets are of the concentrately wound type, the coils can be easily wound automatically and easily connected into polyphases. As a consequence, the labor cost for coil winding can be reduced and the self-starting frequency can be increased due to the polyphase connection.

(5) Since the motor is constructed into an inner stator type, the diameter of the air gap as well as the number of the rotor teeth and the permanent-magnet poles are all increased, and a stepping motor of a small size and high resolution is thereby obtained.

What is claimed is:

1. A stepping motor comprising:
   a stator including a laminated circular ferromagnetic core member having a plurality of slots therein; a plurality of concentrically wound coils positioned in said slots to form multiphase electromagnetic poles; and a plurality of thin planar shaped permanent magnets adhered to said circular core member adjacent the circumference thereof to provide a plurality of magnetic poles arranged in oppositely magnetically oriented pairs of equal width; and
   a rotor including a substantially flat, circular bottom portion and a circumferential rim portion extending from the circumferential edge of said circular bottom portion and adjacent said permanent magnets with an air gap therebetween, the outer edge of said rim portion having a plurality of teeth formed therein.

2. A stepping motor as claimed in claim 1 wherein said rotor teeth have a tooth pitch substantially equal to the width of one of said pole pairs.

3. A stepping motor as claimed in claim 1 wherein said stator magnets provide Nm pole pairs and said rotor has Nt teeth, with $|Nm-Nt|=2$.

4. A stepping motor as claimed in claim 1 wherein:
   said stator core member comprises a circular disc having said slots therein, with said magnets adhered to the circumferential edge thereof; and
   said rotor rim portion extends at substantially a right angle from said rotor bottom portion to give said rotor a pan shape, with said teeth formed in the pan edge.

5. A stepping motor as claimed in claim 1 wherein:
   said stator includes a substantially circular planar central portion having said slots therein and a circumferential portion extending from said central portion at substantially a right angle thereto to give said stator a pan shape, with said magnets adhered to the pan edge; and
   said rotor comprises a circular disc positioned within said pan shaped stator and having said teeth formed in the outer edge thereof.

6. A stepping motor as claimed in claim 1 wherein said rotor bottom portion is formed of aluminum alloy.

7. A stepping motor as claimed in claim 1 wherein said stator further includes a housing secured to said stator core member and a plurality of bearings within said housing, and wherein said rotor further includes a shaft member extending through said stator housing, supported by said bearings and having a first end connected to said rotor bottom portion and a secured end adapted for connection to a load.

8. A stepping motor as claimed in claim 7 wherein said stator further comprises a printed circuit board connected to said housing adjacent said shaft second end and electronic circuitry on said printed circuit board.

* * * * *